May 12, 1925.
A. C. BUNKER
FISH BAIT
Filed April 3, 1924
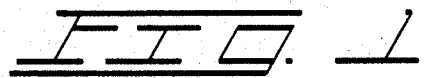
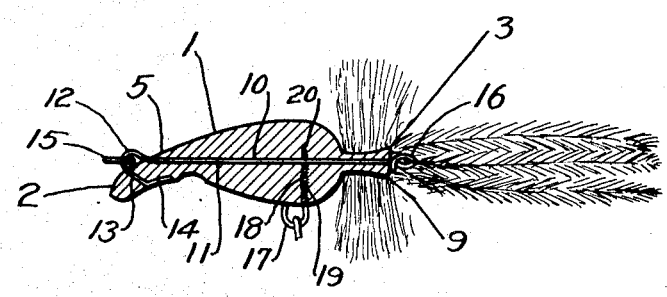
INVENTOR
Artemas C. Bunker
Harry Bowen
ATTORNEY Patented May 12, 1925.

1,537,290

UNITED STATES PATENT OFFICE.

ARTEMAS C. BUNKER, OF SEATTLE, WASHINGTON.

FISH BAIT.

Application filed April 3, 1924. Serial No. 703,844.

*To all whom it may concern:*

Be it known that I, ARTEMAS C. BUNKER, a citizen of the United States, residing at Seattle, in the county of King and State of Washington, have invented a new and useful Fish Bait; and I do hereby declare that the following is a full, clear, and exact specification, such as will enable others skilled in the art to which it appertains to make and use the same.

The invention is a fish bait which when drawn through the water will move in a zig-zag line and at the same time have a small quick jerky motion from side to side.

The object of the invention is to provide an active fish bait.

Another object of the invention is to provide a fish bait which will have a slight upward and downward motion as it is drawn through the water.

And a further object of the invention is to provide a fish bait which will have a quick jerky motion from one side to the other as it moves forward in a zig-zag line.

With these ends in view the invention embodies a fish bait having a slender pear shaped section with a flattened and downwardly curved section at its forward or smaller end, feathers attached to the larger or rear end, hooks attached to an eye at the under side, and a ring attached to an eye at the forward end, said eye being rigidly held in the bait by the screw portion of the eye at the under side.

Other features and advantages of the invention will be seen from the following description taken in connection with the drawings, wherein:—

Figure 1 is a side view of the bait.

Figure 2 is a longitudinal section of the bait.

In the drawings I have shown my fish bait as it would be made wherein numeral 1 indicates the slender pear section, numeral 2 the curved flattened section at the forward end, and numeral 3 the shank at the rear to which the feathers are attached.

The main or pear shaped section 1 may be made of a solid piece of material with the forward, flattened section 2 extending from its smaller end and a groove 4 between the two sections. The upper surface 5 of the section 2 will be flattened from a point 6 to the tip 7 and will have a slight curve from the point 6 to a point 8 and a quicker curve from the point 8 to the point 7. This surface will extend straight across the section. The under side of the section 2 will be curved transversely from the same center as that of the section 1 and will have a slight concave curve from the outer end to the edge of the groove 4. The narrow cylindrical shaped section 3 will extend outward from the larger or rear end of the section 1 and this section will have a somewhat enlarged outer end 9 which will prevent the feathers or the like slipping off. It will be seen that feathers or the like may be attached to this rear section in any suitable manner.

In the center of the bait is a small round hole 10 in which a wire 11 is placed, the forward end of which is bent to form an eye 12 and then forced through an opening 13 and bent and pressed into the under side of the section 2 as shown at the point 14 in Figure 2. This will cause the forward end to be positively held in the device and the wire will reinforce the wood at the groove 4 and at the rear of the section 1. A ring 15 may be placed through the eye 12 as it is being installed. At the rear end of the wire 11 is a loop 16 to which the rearwardly extending feathers may be attached by any suitable means. An eye 17 with a threaded shank 18 may be screwed into an opening 19 which extends vertically from the under side of the device to a point 20 which is somewhat above the opening 10 so that as the eye 17 is screwed into place it will engage the wire 11 in the opening 10 and force it toward one side where it will be rigidly held by the screw. The open end of the eye 17 will bear against the under side of the device as shown. A hook or hooks 21 may be placed through the eye 17 and held in it in any suitable manner.

It will be understood that changes may be made in the construction without departing from the spirit of the invention. One of which changes may be in the shape of the rear section 3 to which the feathers are attached; another may be in the use of a different device at the forward end to which the fishing line may be attached; and still another may be in the use of a different means for attaching the hooks to the device.

To use the device it may be constructed as shown and it will be seen that as it is drawn through the water the flat surface at the forward end will twist slightly and cause the device to move from one side to the other in a zig-zag line and the groove 4, between the two sections, will cause it to jump or move in the quick jerky or choppy action from side to side; and a quick downward curve at the forward end of the flat surface will cause it to bob up and down with a quick jerky movement as it is drawn through the water. It will be seen that this will therefore, provide an extremely active bait which will attract the fish.

Having thus fully described the invention what I claim as new and desire to secure by Letters Patent, is:—

1. A fish bait having a thin pear shaped section with another section at its forward or smaller end and a groove extending around the under side of the narrow portion between them, said pear shaped section having feathers attached to its larger or rear end and an eye on its under side to which hooks may be attached; and said section at the forward end having a flattened upper surface which extends downward toward the front on a slight curve to a point a short distance from the front and then with a quick curve from this point to the tip, a slightly concaved lower surface which is made on a radius from a line which would correspond with the axis of the pear shaped section, and having an eye in its upper surface to which the line may be attached.

2. A fish bait of the class described embodying a narrow pear shaped section with a section at its forward or smaller end having a flat upper surface which is curved slightly downward from the point of intersection of the two sections to a point a short distance from the forward end and then downward on a curve to the end, said sections having a groove extending around their under sides at the point of intersection of the two sections, a small round hole extending through them on the axis of the pear shaped section, a wire extending through the hole with a loop at the rear end and having its forward end bent to form an eye and extending through the forward section so that it may be bent over on the under side and clinched, a screw eye screwed into an opening on the under side so that it will engage and hold the wire that passes through the center of the device.

3. A fish bait of the class described having a tapering cylindrical shaped rear section with feathers attached to it and having its smaller end toward the front, another tapering cylindrical shaped section with its upper portion cut away on a straight transverse line and curved slightly downward from the point of intersection of the two sections, said sections having a groove between them and extending around their curved surfaces, means for attaching the line to the forward end which will extend all of the way through the center of the device, and other means for attaching hooks to the device which will extend upward beyond the center and hold the line attaching means in place.

ARTEMAS C. BUNKER.